A. HERRING.
MAKING POTATO CRULLS.

No. 179,193. Patented June 27, 1876.

Witnesses:
James Martin Jr.
J. P. Theodore Laug.

Inventor:
Anaxamander Herring
by
Mason Fenwick Lawrence
Attys.

UNITED STATES PATENT OFFICE.

ANAXAMANDER HERRING, OF CROWN POINT, NEW YORK.

IMPROVEMENT IN MAKING POTATO CRULLS.

Specification forming part of Letters Patent No. 179,193, dated June 27, 1876; application filed May 13, 1876.

*To all whom it may concern:*

Be it known that I, ANAXAMANDER HERRING, of Crown Point, in the county of Essex and State of New York, have invented a new and useful machine for reducing potatoes to thin continuous "strips" in the form of a ribbon, which vegetable strips are adapted for use in the process of producing a delicate article of diet for table use, which I term "Potato Crulls;" and my invention consists, first, in the construction of a machine adapted to reduce, in a very expeditious manner, a potato to a condition in which this vegetable may be utilized for such purpose; and, second, in the process of making the crulls from such vegetable.

Heretofore potato crulls have been made— notably at a hotel near Saratoga Lake in the State of New York—by transversely slicing the potato with a very sharp table-knife, each potato being cut into a great number of very thin slices, each one of which must separately be taken and wiped dry after being washed, before immersing them in a vessel of boiling lard, in which they are cooked. This slicing process makes it impossible to cut each slice of a uniform thickness, and hence there is not only a lack of uniformity in cooking, but also a lack of uniformity in the color of the food when ready to be served or eaten. In other words, the thick slices will be light colored, and perhaps not cooked enough, while the thin slices will be dark colored and perhaps overcooked; whereas the whole number of slices put into the lard-vessel at one time should be cooked with equal thoroughness, and also present in color a uniform nut-brown shade, and all equally delicately tender. These results I attain by my invention, as well as avoid the liability of cutting the fingers, so often occurring during the act of slicing the potato as heretofore practiced.

Figure 1:
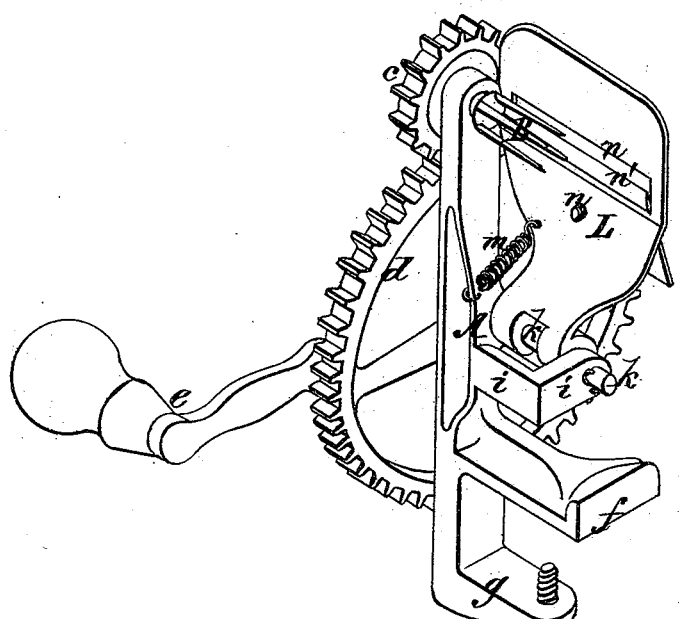
Figure 2:
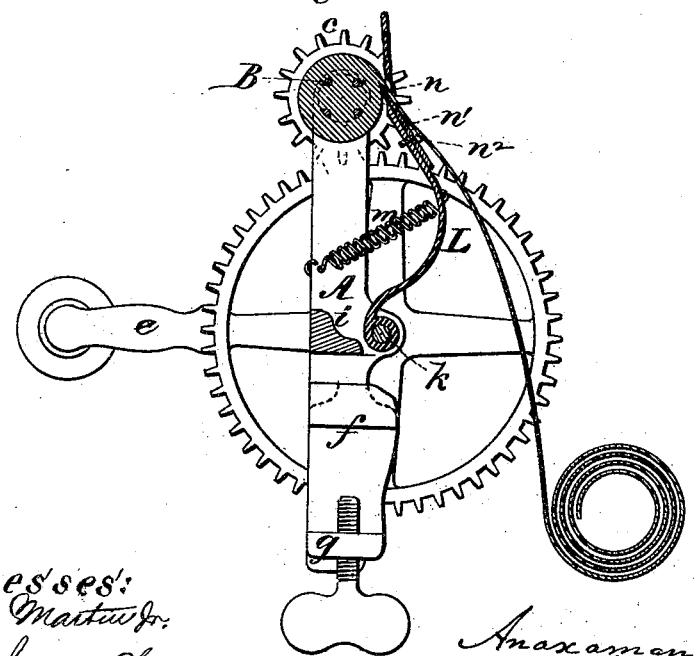

In Figure 1 I have represented by perspective view the machine I employ for reducing a potato to a vegetable ribbon or shaving; and Fig. 2 is a vertical section thereof.

A is a main frame or support for the operating parts of the machine, which, at its upper end, is perforated to receive the shank of a four-tined fork, B, the shank being firmly secured to a pinion-wheel, $c$, which receives motion from a main cog-wheel, $d$, driven by the handle $e$ secured to such main wheel. The projections $f$ and $g$, which constitute a portion of the main frame A, afford means for securing the machine to a table during its operation, being held in position by means of a screw, $h$. The bracket $i$ affords a bearing through which a pin, $k$, passes, as shown, with its outer end firmly secured to the center of the main wheel $d$, and so forms an axis of rotation for said wheel. Within this bracket, and articulating upon the pin $k$, is a self-adjusting knife-back, L, the adjustment of which, during the act of reducing a potato to the form of a shaving or a continuous ribbon strip, is effected by the retracting-spring $m$, having one of its ends attached to the main frame and its opposite end to the edge of the knife-back, as shown in the figures. The upper portion of this knife-back is expanded in width with reference to the length of the fork, in order to afford a full bearing upon the entire length of a potato after the uneven outer surface of the potato has been shaved away. The knife-back is perforated with a cross-slot, as at $n$, and receives within it a steel cutter, $n^1$, held in position by a set-screw, $n^2$, by means of which and a slot made through the cutter $n^1$, the latter may be adjusted to take a shaving from off the potato at any desired thinness, and of a width equal to the length of the potato placed upon the fork B.

In the construction of the machine I make the widened portion of the knife-back L fully equal to the length of the largest sized potatoes, so that when a potato has its ends clipped off before being placed upon the fork, the cutting-knife $n^1$ will be fully equal to the length of the potato thus clipped of its ends, and by so doing one or two turns of the machine will free the potato of its rind and reduce its body to a cylindric form, after which the body of the potato will be reduced by cutting therefrom a shaving or vegetable ribbon, the width of the cutter $n^1$, until the core of the potato is reached, at which time the machine is stopped and the core removed.

In Fig. 2 the operation of shaving a continuous strip or ribbon from a potato is represented. During this act the spring $m$ constantly draws the knife-back L up snug against the potato-cylinder, and with a movement always in the same vertical plane, and while this is being done the rotation and fixed position of the fork B always remain the same. This simple uniform action and movement of the knife-back and fork with relation to each other admits of cutting a shaving from the potato of a perfectly uniform desired thinness.

A single potato having been reduced to strips or ribbons, as indicated in Fig. 2, the operator then gathers up the entire strip and rinses it in pure tepid water. He then takes hold of it at one end and draws the ribbon or shaving its entire length through a cloth held by his other hand, thus removing all mucilage or starchy matter from its surfaces, as well as the drippings of the water in which it has been washed. This done, the shaving or ribbon is ready to be put into the boiling lard, which, in a moment or two of time, will cook it uniformly throughout its entire length, and leave it all of a uniform nut-brown color.

Potato crulls made in this manner present an article of food pleasing to the eye, owing to the curls and volute forms which the act of cooking produces, while, at the same time, there is uniformity in the cooking and in the color; and, lastly, an article of food of the most delicate character and gratifying to the palate is produced.

What I claim as new, and desire to secure by Letters Patent, is—

1. The combination of the fork B and a slicing-knife back, L, turning upon a pivot, $k$, as described, for the purpose set forth.

2. A crull formed of a continuous strip or ribbon shaved off from the body of the potato previous to cooking, substantially as described.

3. The process of making crulls of continuous strips cut or shaved from the periphery or sides of a potato, substantially as described.

Witness my hand in matter of my application for a patent for a machine for reducing potatoes to the form of a ribbon preparatory to cooking the same.

ANAXAMANDER HERRING.

Witnesses:
JAMES MARTIN, Jr.,
CHAS. H. MOULTON.